(12) United States Patent
Ohlinger et al.

(10) Patent No.: US 6,663,738 B2
(45) Date of Patent: Dec. 16, 2003

(54) METHOD FOR PREPARATION OF A POLYOLEFIN FOIL AND ITS UTILIZATION

(75) Inventors: Rainer Ohlinger, Hannover (DE); Burkhard Schäfer, Hannover (DE); Jürgen Bühring, Burwedel (DE)

(73) Assignee: Benecka-Kaliko AG (DE)

( * ) Notice: Subject to any disclaimer, the term of this patent is extended or adjusted under 35 U.S.C. 154(b) by 148 days.

(21) Appl. No.: 09/829,196

(22) Filed: Apr. 9, 2001

(65) Prior Publication Data

US 2002/0121730 A1 Sep. 5, 2002

(30) Foreign Application Priority Data

Apr. 12, 2000 (DE) .......................... 100 18 196

(51) Int. Cl.⁷ .................. B29C 51/02; B29C 51/08; B29C 51/14; B29C 59/02; H01J 37/30
(52) U.S. Cl. .................. 156/245; 156/272.2; 264/293; 264/485; 264/544
(58) Field of Search .................. 264/293, 485, 264/544; 156/209, 245, 272.2

(56) References Cited

U.S. PATENT DOCUMENTS 4,740,335 A * 4/1988 Scholz et al. ............... 264/485

FOREIGN PATENT DOCUMENTS

| DE | 197 43 053 A1 | 1/1999 |
| EP | 0 613 722 A1 | 9/1994 |
| WO | WO 98/42453 A1 | 10/1998 |
| WO | WO 00/18994 A2 | 4/2000 |

OTHER PUBLICATIONS

Abstract of Japan 62152731 (Jul. 7, 1987).
Abstract of Japan 04097844 (Mar. 30, 1992).
Abstract of Japan 04151188 (May 25, 1992).
Abstract of Japan 11049866 (Feb. 23, 1999).

* cited by examiner

Primary Examiner—Leo B. Tentoni
(74) Attorney, Agent, or Firm—Fay, Sharpe, Fagan, Minnich & McKee, LLP

(57) ABSTRACT

A method for the preparation of a polyolefin foil by developing a foil from mass having a content of polyolefin and with subsequent treatment of the foil by an electron beams beam. The polyolefin foil prepare according to the invention specific method distinguishes itself vis-à-vis the state of the art by favorable price, concurrent with excellent ability of being laminated and embossed as well as having high grain stability.

11 Claims, No Drawings

METHOD FOR PREPARATION OF A POLYOLEFIN FOIL AND ITS UTILIZATION

BACKGROUND OF THE INVENTION

The invention concerns a method for the preparation of a foil from a mass with a content of a non-interlaced polyolefin, of compound structures and shaped bodies made from same, as well as their utilization, for example as interior coverings of motor vehicles, in particular as dashboard foil.

Polyolefin foils are currently utilized in the most diverse sectors of the industry. Of particular significance is their utilization as packing material, as cover foil or in combination with other flat-shaped articles as compound structures. Another area of utilization is their further processing into shaped bodies, for example via deep-draw method. Frequently, the polyolefin foils and/or the composite structures and shaped bodies made from same are intended to also fulfill aesthetic functions. The mentioned areas of application require polyolefins to have a particular property spectrum, whereby said foils, in particular in connection with further processing by deep-draw method, shall at the same time have high mechanical stability and resistance toward aging and be embossable and capable of being laminated and have excellent grain stability.

According to the present state of the art, the polyolefin foil with the named properties is prepared by using partially interlaced polyolefin raw materials in mixture with other thermoplastic polyolefins. The partially interlaced raw materials are not obtainable as reactor products. In order to manufacture them it is, therefore, necessary to perform another reaction step after the polymerization. This additional reaction definitely raises the price for these products above the price level of polyolefin commodities. Another drawback of the previously employed method consists in that the polyolefin foil made from the mixture of partially interlaced polyolefin raw materials with other thermoplastic polyolefins is fixed with respect to its interlacing degree and thus with respect to its properties. A foil made of a given mixture is therefore only suitable for a given application spectrum.

SUMMARY OF THE INVENTION

The treatment by electron beams of polyolefin-containing flat-shaped articles for purposes of modification of mechanical properties is known from the state of the art. Thus, EP-A-0 425 695 describes an electron-beam interlaced path-shaped foam, which was obtained via a method which comprises an electron-beam hardening of a mixture of a polyolefin-containing homo- and copolymers and a gas-developing agent and subsequent foaming via thermal treatment. The technical purpose of electron-beam treatment consists in preventing the escape of the gas which develops during the thermal decomposition of the expanding agent by means of interlacing of the polymers on the surface of the foam. The developed foam has a density of 0.005 to 0.1 g/cm$^3$. The subsequently described invention-specific method excludes foaming conditions.

Proceeding from said state of the art, it is the object of the present invention to make available a method for the preparation of polyolefin foils, which are embossable and capable of being laminated, which have excellent grain stability, and in addition, which, in comparison with foils prepared according to previous methods, can definitely be produced more cost-effectively. Furthermore, the invention-specific method shall open up the possibility of also influencing, within certain limitations, the mechanical properties of the polyolefin foils after forming the foils from the starter substances. Moreover, beneficial utilization of these polyolefin foils and/or of the composite structures made from same is being proposed.

According to the invention, this object is solved by means of a method for the preparation of a grained foil from a mass with a content of a non-interlaced polyolefin and, possible, another additive, whereby the obtained foil is treated with electron beams, characterized in that the foil obtained in the conventional manner is treated with electron beams in order to achieve a graining stability suitable for deep-drawing and the grained foil having a density of approximately 0.7 to 1.2 g/cm$^3$ is then deep drawn. As a result of targeted treatment with electron beams, a corresponding interlacing takes place with respect to the previously non-interlaced polyolefin.

DETAILED DESCRIPTION OF THE PREFERRED EMBODIMENTS

The spectrum of the employed non-interlaced polyolefin is, on principle, not subject to any restriction. Preferably employed as non-interlaced polyolefins are: polyolefins such as PP, PE, poly(I-butene), polyisobutylene, poly(4-methylpentene), PP-copolymers or -terpolymers with $C_2$, $C_4$–$C_{12}$-α-olefins, PE-co-polymers or -terpolymers with $C_3$ to $C_{12}$-α-olefins or mixtures thereof, whereby diene monomers may also be employed as co or ter-monomers, which contain non-conjugated dual bonds, such as, for example, 1.4 hexadiene, 5-methyl-1.5-hexadiene, 5-ethylidene-2-norbornene, 5-butyliden-2-norbonene, dicyclopentadiene, 1.4-octadiene, cyclohexadiene or cyclo-octadiene; co-polymers of propylene and/or ethylene with polar co-monomers like acrylic acid and/or its $C_1$–$C_{12}$ esters, methyl acrylic acid and/or its $C_1$–$C_{12}$ esters, vinyl-esters, saturated $C_2$–$C_8$ carbonic acids, optionally with carbon monoxide as ter-monomer, graft copolymers of propylene and/or ethylene with 8–45% grafted on units of unsaturated carbonic acids, dicarbonic acids, their esters and/or anhydrides as well as mixtures of the named polymers. Particularly preferentially employed are polypropylene, polyethylene, polypropylene-co-polymers or terpolymers with $C_2$, $C_4$–$C_{12}$-α-olefins and/or polyethylene-co-polymers or terpolymers with $C_3$–$C_{12}$-α-olefins.

The polyolefins are preferably characterized prior to interlacing by a melt flow index MFI (230° C., 2.16 kg) of approximately 0.1 to 800 g/10 min., in particular approximately 0.1 to 200 g./10 min., most particularly preferred approximately 0.1 to 20 g/10 min.

In addition to the non-interlaced polyolefins, the mass employed for developing the foil can also contain additional components. There may thus also be present a percentage of pre-interlaced polymers, whereby said percentage is to be set up so that the above formulated object will be adequately complied with. These pre-interlaced polymers are preferably employed in a quantity which is smaller than 10%, preferably smaller than approximately 5% and in particular smaller than 3%.

In addition to the polymer constituents, the mass employed for the preparation of the foil preferably contains a series of auxiliary agents, such as interlacing substances, anti-oxidation means, light protection means and/or aging protection means. So as to obtain, for example, an adequate interlacing degree during the subsequent electron beam treatment, an interlacing auxiliary is preferably employed. This applies in particular to polyolefins for which the chain fission, which takes place as a concurrent reaction to the interlacing, produces notable effect. Affected are, in particular, polyolefins with tertiary and quaternary C-atoms. Employed as interlaing auxiliaries are, in particular, singly- or multiply-unsaturated compounds, such as acrylate of 1- or multi-valent alcohols, such as, for example, trimethylolpropantriacylate, methacrylate of 1 or multi-valent alcohols, such as, for example, trimethylolpropantrimethacrylate, vinyl-functional components, such as styrene and di-vinyl-benzol, allyl-compounds, such as triallycyanurate, triallylisocyante, sulfur, p-chinodioxime, N-methyl-N, 4-dinitrosaniline, nitrobenzol, diphenylguandine, trimethylolpropane-N,N'-m-phenylen-dimaleimide.

Trimethylolpropantrimethacrylate is particularly preferred as interlacing agent. In a beneficial specific embodiment, interlacing agents are employed in a quantity of up to approximately 20% by weight, preferably up to approximately 10% by weight, and, more particularly, of approximately 2 to 6% by weight in proportion to the contents of the mass of non-interlaced polyolefins. Preferably included are antioxidation means, especially phenol derivatives, lactones, phosphites, and/or sterically inhibited amines in a quantity of up to approximately 5, preferably up to approximately 3.5% by weight, more particularly of up to approximately 0.2 to 2.5% by weight in relationship to the weight of the mass.

If mention is made, within the scope of the invention, that the invention-specific radiated foil is obtained in the customary manner, then this information, by itself, sufficient for the addressed expert. Specifically involved may be an extrusion method, co-extrusion and calendering method, including blow forming. The foil formation with non-interlaced components has the advantage, especially with respect to the extrusion and calendering method, that is it possible, in contrast to the pre-interlaced component, to perform this process step at low temperature and with greater speed. The interlacing of the foil can be done either directly after foil preparation, after a varnishing process, after a laminating process or an embossing process. Radiation can take place on one side as well as on both sides. With respect to single side radiation, the view side as well as the reverse side may be facing the electron beam source during the interlacing.

The thickness of the foil prepared according to the invention is not critical, whereby a thickness is preferred of approximately 0.2 to 2.0, in particular of approximately 0.4 to 1.4 mm. Within the scope of the invention, the foil thickness, as it exists after radiation lies within relative large parameters, particularly in the range of approximately 0.8 to 1.0, preferably in the range of approximately 0.85 to 0.95 gcm$^3$.

The mechanical properties of the radiated foils in accordance with the invention can be controlled, within certain limitations, by means of the beam dosis applied during the interlacing via electron beams. Beneficially, treatment with electron beams is performed with a beam dosis of approximately 10 to 500, in particular of approximately 30 to 300 kJ/m$^2$. The gel contents of the polyolefin foils, which is of great significance for the mechanical properties, is also influenced by the applied beam dosis. Within the scope of the present invention, the gel content was determined according to the extraction method. Treatment of the foil with electron beams is beneficially undertaken to such degree that a gel content occurs of approximately 5 to 80, in particular of approximately 15 to 65%.

The radiated polyolefin foil prepared according to the invention specific method distinguishes itself by its particularly good embossing capability. In a preferred specific embodiment, the polyolefin foil is, therefore, subjected to embossing, for example graining. The high graining stability of the foil proves itself as particularly beneficial. Another benefit of the polyolefin foil prepared in accordance with the invention consists in the excellent lamination capability, so that it can be beneficially laminated to form composite structures. Beyond that, the polyolefin foil or the composite structures prepared from same can be deep-drawn to form a shaped body in a preferred specific embodiment of the invention. The foil can also be further processed prior to the treatment with electron beams, after an embossing and/or laminating step.

The polyolefin foils prepared according to the invention, and the composite structures and shaped bodies produced from them present numerous advantages. In particular suited are the obtained invention-specific and into shaped bodies transformed polyolefin foils for use as interior linings of motor vehicles, specifically as dash-board foil, whereby high graining stability is an important consideration, since, due to the long usage length of motor vehicles, these very automotive dashboard foils are subjected to high demands. A stable, clean graining image commands particular importance for the quality impression of interior linings of motor vehicles. Substitution of pre-interlaced polyolefins in the starter mass by non-interlaced polyolefins leads to significant cost savings. Another benefit consists in that the subsequent interlacing of the foils by adjustment of an appropriate beam dosis makes it possible, within certain limitations, to influence the mechanical properties. The polyolefin foils according to the invention have, aside from high graining stability, excellent embossing and lamination capability. Thus it has been shown that in the further processing by deep draw method, particularly beneficial properties are being preserved.

With the known methods it frequently happens that during the deep-draw process, areas of the deep-drawn foil are disturbed in their homogeneity and/or even torn apart. These detrimental apparations are largely excluded according to the invention. Finally, the surface shine of the foils obtained in accordance with the invention is significantly reduced.

The inventions will be explained in more detail below, making use of examples:

EXAMPLE 1

Extrusion of Foils from Masses with a Polyolefin Contents

Mixtures of polyolefins and other components according to the recipes shown in Table 1 were extruded to foils having a thickness of 0.45 mm on a two-spindle extruder (ZSK 25 4D 28). Cylinder and nozzle temperatures were adjusted in accordance with data shown in Table 2.

TABLE 1

Recipes Employed for Extrusion of Foils

| | 1 | 2 | Comparison Example |
|---|---|---|---|
| Thermoplastic Elastomer (non-interlaced) density 0.89 g/ml, MFI 1.0 g/10 min, (230° C.; 2.16 kg) | 80 | 80 | — |
| Very low density Polyethylene, density 0.88 g/ml, MFI 0.5 g/10 min (190° C.; 2.16 kg) | 20 | 20 | 15 |

TABLE 1-continued

Recipes Employed for Extrusion of Foils

| | 1 | 2 | Comparison Example |
|---|---|---|---|
| Trimethylolpropantrimethacrylate | 2 | 2 | — |
| Thermoplastic Elastomer (interlaced) Density 0.88 g/ml, MFI 10–15 g/10 min (230° C.; 10 kg), Interlacing Degree 35% | | | 50 |
| Random Co-Polymers PP, density 0.90 g/ml MFI 0.5 g/10 min (230° C.; 2.16 kg) | | | 35 |
| Benzotriazole-derivative (UV-Protection Agent) | 0.2 | 0.2 | 0.2 |
| Benzotriazole-derivative (UV-Protection Agent) | 0.2 | 0.2 | 0.2 |
| Sterically inhibited Phenol (antioxidant) melting range 110–125° C. | 0.1 | 0.3 | |
| Carbon Black (Pigment) | 3 | 3 | 3 |

TABLE 2

Cylinder and Nozzle Temperatures in ° C. during Extrusion of Foils

| | Zone 1 | Zone 2 | Zone 3 | Zone 4 | Zone 5 | Zone 6 |
|---|---|---|---|---|---|---|
| Cylinder | 180 | 175 | 185 | 195 | 205 | — |
| Nozzle | 210 | 210 | 210 | 210 | 210 | 210 |

The extruded foils were cut into 82 cm long strips and half way embossed with a silicon grain pattern.

EXAMPLE 2

Radiation of Foils from Example 1 with Electron Beams and Deep Drawing over a Small Roof Shape The foils prepared in Example 1 were subjected, either untreated or after radiation with 30 kJ/m$^2$, 75 kJ/m$^2$ or 150 kJ/m$^2$, to a deep draw process over a small roof shape. The deep drawing took place at a temperature of 160° C. Subsequently, the thusly treated foils were evaluated with respect to shaping, graining and shine. Table 3 shows the results.

TABLE 3

| | 1 (acc. to invention) | 2 (acc. to invention) | Comparison Example |
|---|---|---|---|
| Deep-drawing over small roof shape at 160° C./not radiated | | | |
| Shaping | acceptable | acceptable | acceptable |
| Graining | flat | flat | clearly delineated, lifted graining pattern |
| Brilliance | very shiny | very shiny | dull |
| Deep-drawing over small roof shape at 160° C./30 kJ/m$^2$ | | | |
| Shaping | acceptable | acceptable | |
| Graining | clearly delineated lifted graining valleys | clearly delineated lifting graining valleys | |
| Brilliance | very shiny | very shiny | |
| Deep-drawing over small roof shape at 160° C./75 kJ/m$^2$ | | | |
| Shaping | acceptable | acceptable | |
| Graining | clearly delineated lifted graining valleys | clearly delineated lifted graining valleys | |
| Brilliance | very shiny | very shiny | |

TABLE 3-continued

| | 1 (acc. to invention) | 2 (acc. to invention) | Comparison Example |
|---|---|---|---|
| Deep-drawing over small roof shape at 160° C./150 kJ/m$^2$ | | | |
| Shaping | acceptable | acceptable | |
| Graining | clearly delineated, graining valleys not lifted | clearly delineated, graining valleys not lifted | |
| Brilliance | dull | dull | |

EXAMPLE 3

Determination of Gel Contents According to the Extraction Method

Protocol for Determining the Gel Contents According to the Extraction Method:

As sample specimens, three foil strips having a thickness of 1 mm are accurately weighed (the weight should be approximately 0.0475 g).

The samples are put in glass test tubes, into which are placed stoppers of stainless steel wire in order to prevent floating of the samples.

The glass tubes are filled to the upper rim with xylol and closed with foil to prevent evaporation of the solvent. In addition, all test tubes are wrapped in a layer of foil.

All samples are placed for 24 hours into an oil bath heated to 120° C. temperature.

A screening drum is accurately weighed for each sample (the screening units have a mesh number of 200 and weigh approximately 10 times the weight of the sample).

After the 24 hour incubation in the oil bath, the xylol residue is filtered via the screening drum from the test tubes, whereby the "gel" remains inside the screening drum.

Subsequently, the screening drums are placed on metal plate and dried for at least 5 hours in a vacuum oven at 150° C.

After the 5 hour drying time in the vacuum oven, one lets the screening drums cool down to room temperature for about 10 minutes.

After that, an accurate weight is established with respect to the gel containing screening drums.

The following formulae are used in order to determine the gel contents:

$$[\text{weight(gel-laden screening drum)}] - [\text{weight screening drum without gel}] = [\text{weight(gel)}] \quad (1)$$

$$\frac{[\text{weight(gel)}] * 100}{[\text{weight of sample}]} = [\text{gel contents of sample}] \quad (2)$$

The gel content shown in Table 4 was measured for the foils that had been subjected to varied radiation dose treatments and deep drawn over a small roof shape.

TABLE 4

| | 1 | 2 | Comparison Example |
|---|---|---|---|
| deep-drawing over small roof shape at 160° C./not radiated | | | |
| Gel content extraction method | 0 | 0 | 25 |
| deep-drawing over small roof shape at 160° C./30 kJ/m² | | | |
| Gel content extraction method | 1 | 5 | |
| deep-drawing over small roof shape at 160° C./75 kJ/m² | | | |
| Gel content extraction method | 12 | 18 | |
| deep-drawing over small roof shape at 160° C./150 kJ/m² | | | |
| Gel content extraction method | 34 | 46 | |

What is claimed is:

1. A method for the preparation of a shaped body with an embossed surface from a mass including non-interlaced polyolefins, a stablizer and optional further additives, the method comprising:

the prep ration of a foil from said mass, embossing said foil, treating the embossed foil with electron beams to such an extent that a gel content of approximately 15 to 65% occurs in the radiated embossed foil and deep drawing the embossed foil to said shaped body, the foil having a density o approximately 0.7 to 1.2 g/cm³.

2. The method according to claim claim 1, wherein polypropylene, polyethylene, polypropylene-co-polymers or terpolymers with $C_2$, $C_4$–$C_{12}$-α-olefins and/or polyethylene-co-polymers or terpolymers with $C_3$ to $C_{12}$-α-olefins are employed as the non-interlaced polyolefins.

3. The method according to claim 1 wherein an interlacing auxiliary is included in the mass.

4. The method according to claim 3, wherein trimehylpropantriacrylate is selected as interlacing auxiliary.

5. The method according to claim 3 wherein trimethylolpropantriacrylate is employed in a quantity of up to 20% by weight in proportion t the contents of the mass of non-interlaced polyolefins.

6. The method according to claim 1, wherein stabilizers in the mass comprise phenol derivatives, lactones, phosphites and/or sterically inhibited amines in a quantity of up to approximately 5% by eight.

7. The method according to claim 1 wherein the electron b am treated foil has a thickness of approximately 0.2 to 2.0 mm.

8. The method according to claim 1 wherein the treatment with electron beams is effected at a beam dose of approximately 10 to 500 kJ/m².

9. The method according to claim 1 wherein the radiated foil is laminated to a composite structure that is deep drawn to a shaped body.

10. The method according to claim 9, wherein th deep drawn shaped body is utilized as an interior lining of motor vehicle, in particular as dashboard foil.

11. The method according to claim 7 wherein the m treated foil has a thickness of approximately 0.4 to 1.4 mm.

* * * * *

UNITED STATES PATENT AND TRADEMARK OFFICE
CERTIFICATE OF CORRECTION

PATENT NO. : 6,663,738 B2
DATED : December 16, 2003
INVENTOR(S) : Rainer Ohlinger, Burkhard Schafer and Jurgen Buhring It is certified that error appears in the above-identified patent and that said Letters Patent is hereby corrected as shown below:

<u>Title page</u>,
Item [75], Inventors, "Jurgen Buhring, Burwedel (DE)" should read
-- Jürgen Bühring, Burgwedel (DE) --

Signed and Sealed this

First Day of June, 2004

JON W. DUDAS
*Acting Director of the United States Patent and Trademark Office*

(12) INTER PARTES REEXAMINATION CERTIFICATE (1247th)
United States Patent
Ohlinger et al.

(10) Number: US 6,663,738 C1
(45) Certificate Issued: Mar. 18, 2016

(54) METHOD FOR PREPARATION OF A POLYOLEFIN FOIL AND ITS UTILIZATION

(75) Inventors: Rainer Ohlinger, Hannover (DE); Burkhard Schäfer, Hannover (DE); Jürgen Bühring, Burgwedel (DE)

(73) Assignee: BENECKE-KALIKO AG, Hannover (DE)

Reexamination Request:
No. 95/000,611, Dec. 17, 2010

Reexamination Certificate for:
Patent No.: 6,663,738
Issued: Dec. 16, 2003
Appl. No.: 09/829,196
Filed: Apr. 9, 2001

Certificate of Correction issued Jun. 1, 2004

(30) Foreign Application Priority Data

Apr. 12, 2000 (DE) .................. 100 18 196

(51) Int. Cl.
| | | |
|---|---|---|
| *B29C 71/00* | (2006.01) | |
| *B32B 3/26* | (2006.01) | |
| *B29C 71/04* | (2006.01) | |
| *C08J 7/00* | (2006.01) | |
| *C08J 7/18* | (2006.01) | |
| *B29C 35/08* | (2006.01) | |
| *B29C 59/00* | (2006.01) | |
| *B29C 51/08* | (2006.01) | |
| *C08K 5/103* | (2006.01) | |
| *C08K 5/13* | (2006.01) | |
| *C08K 5/151* | (2006.01) | |
| *C08K 5/3435* | (2006.01) | |
| *C08K 5/524* | (2006.01) | |
| *C08L 23/02* | (2006.01) | |
| *B29K 105/24* | (2006.01) | |
| *B29L 7/00* | (2006.01) | |
| *B29L 9/00* | (2006.01) | |
| *B29K 105/00* | (2006.01) | |

(52) U.S. Cl.
CPC . *C08J 7/18* (2013.01); *B29C 71/04* (2013.01); *B32B 3/26* (2013.01); *B29C 59/00* (2013.01); *B29C 2035/0877* (2013.01); *B29K 2105/243* (2013.01); *B29K 2105/256* (2013.01); *B29L 2007/001* (2013.01); *B29L 2009/00* (2013.01); *C08J 2323/02* (2013.01)

(58) Field of Classification Search
None
See application file for complete search history.

(56) References Cited

To view the complete listing of prior art documents cited during the proceeding for Reexamination Control Number 95/000,611, please refer to the USPTO's public Patent Application Information Retrieval (PAIR) system under the Display References tab.

*Primary Examiner* — Alan Diamond

(57) ABSTRACT

A method for the preparation of a polyolefin foil by developing a foil from mass having a content of polyolefin and with subsequent treatment of the foil by an electron beams beam. The polyolefin foil prepare according to the invention specific method distinguishes itself vis-à-vis the state of the art by favorable price, concurrent with excellent ability of being laminated and embossed as well as having high grain stability.

INTER PARTES REEXAMINATION CERTIFICATE

THE PATENT IS HEREBY AMENDED AS INDICATED BELOW.

AS A RESULT OF REEXAMINATION, IT HAS BEEN DETERMINED THAT:

Claims 1-11 are cancelled.

\* \* \* \* \*